United States Patent [19]
Gallazzini

[11] Patent Number: 5,628,440
[45] Date of Patent: May 13, 1997

[54] BICYCLE CARRIER

[76] Inventor: Silvio Gallazzini, 25 Mann Ave., Staten Island, N.Y. 10314

[21] Appl. No.: 306,838
[22] Filed: Sep. 15, 1994
[51] Int. Cl.$^6$ ........................................ B60R 9/10
[52] U.S. Cl. ................ 224/329; 224/556; 224/493; 224/497; 224/534; 224/309; 224/924
[58] Field of Search .................... 224/556, 557, 224/568, 42.39, 924, 329, 493, 497, 533, 534, 309, 311

[56] References Cited

U.S. PATENT DOCUMENTS

| | | | |
|---|---|---|---|
| 3,921,869 | 11/1975 | Rogers | 224/924 |
| 4,524,893 | 6/1985 | Cole. | |
| 4,676,413 | 6/1987 | Began et al. | 224/924 |
| 5,038,980 | 8/1991 | Baldeck | 224/493 |
| 5,056,700 | 10/1991 | Blackburn. | |
| 5,065,921 | 11/1991 | Mobley | 224/329 |
| 5,118,018 | 6/1992 | Baldeck. | |
| 5,230,449 | 7/1993 | Collins et al. | |

FOREIGN PATENT DOCUMENTS 2355694  1/1978  France ........................ 224/924

OTHER PUBLICATIONS

"Hardt B14 Bicycle Carrier for 914 Porsche," Jul. 1977.

*Primary Examiner*—Henry J. Recla
*Assistant Examiner*—Charles R. Eloshway

[57] ABSTRACT

A collapsible, lightweight bicycle carrier for a vehicle that can be installed and removed easily by one person. When removed from the vehicle, the hollow and capped tube, that serves as the anchor for the front looped straps, is utilized to store the strapping components of the carrier. The capped tube is dimensioned to fit in a standard water bottle carrier supplied with the bicycle. The bicycle is attached to the vehicle using two looped straps dimensioned to fit over the storage tube. The tube is anchored through a vehicle opening. The bicycle is furnished with protective pads that fasten to the bicycle frame and handlebars. The bicycle is inverted and attached to the trailing ends of the looped straps that extend through the gap of the vehicle opening. The posterior of the bicycle is then fastened to the vehicle using two straps with adjusting buckles. A rear support structure may also be secured to the seat post of the bicycle. The rear support structure can be left on the bicycle and doubles as a racking system that the cyclist can use to carry parcels or as a bicycle work stand. The rear support structure can be incrementally adjusted both angularly and longitudinally to provide the proper support to the rear of the bicycle as it is inverted and placed on the rear of the vehicle. The posterior of the bicycle is then fastened to the vehicle using two straps with adjusting buckles.

10 Claims, 4 Drawing Sheets

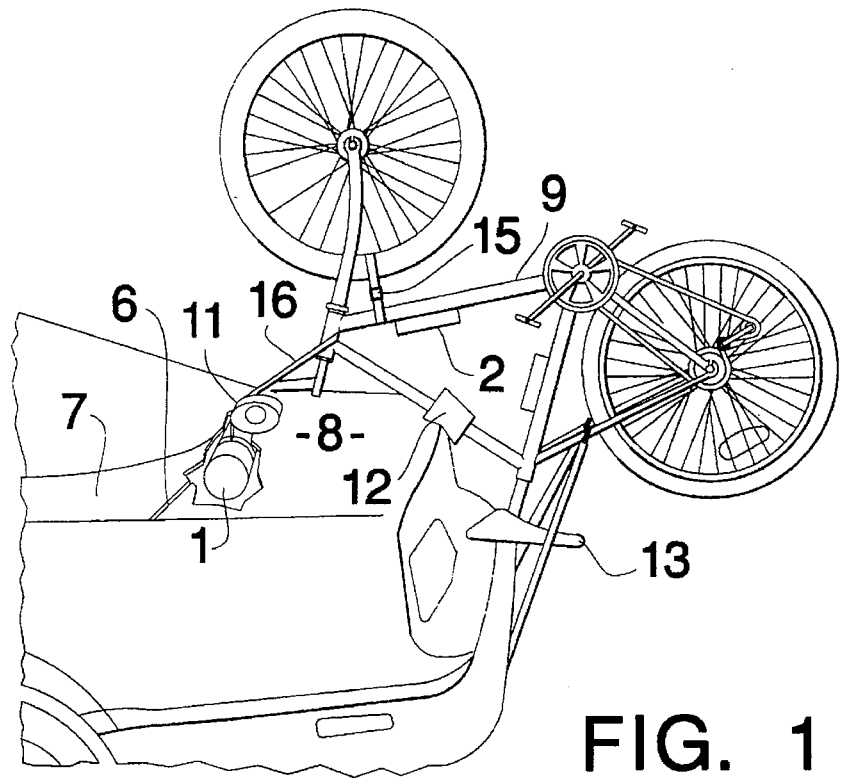
FIG. 1
FIG. 2
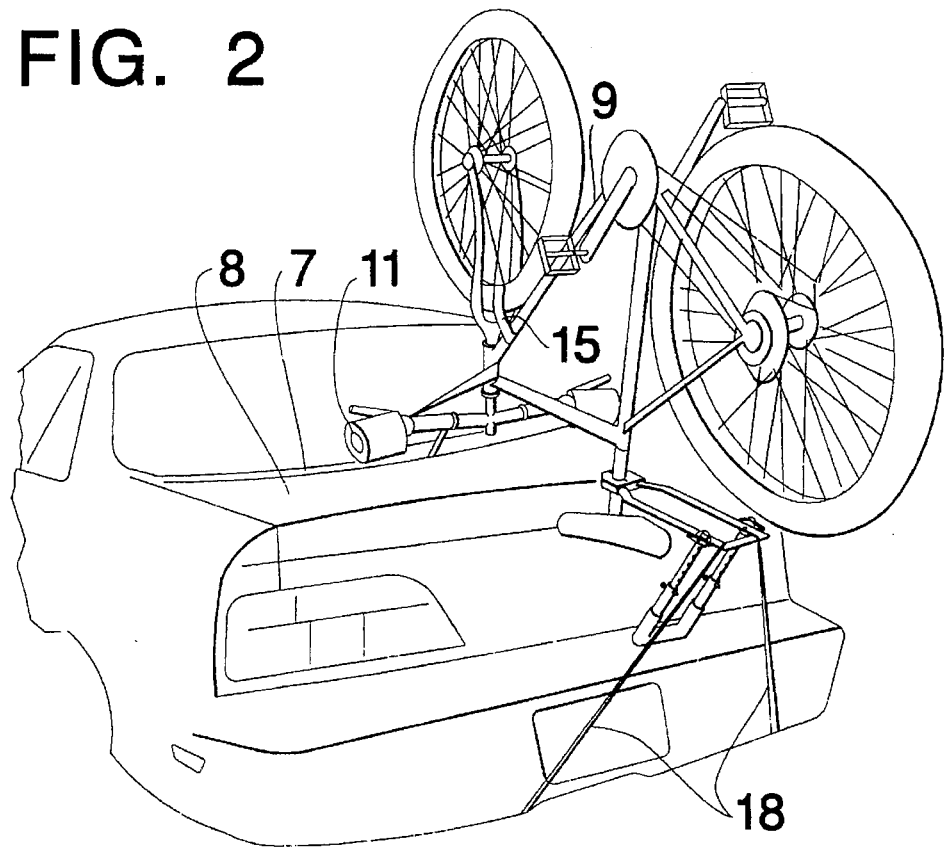

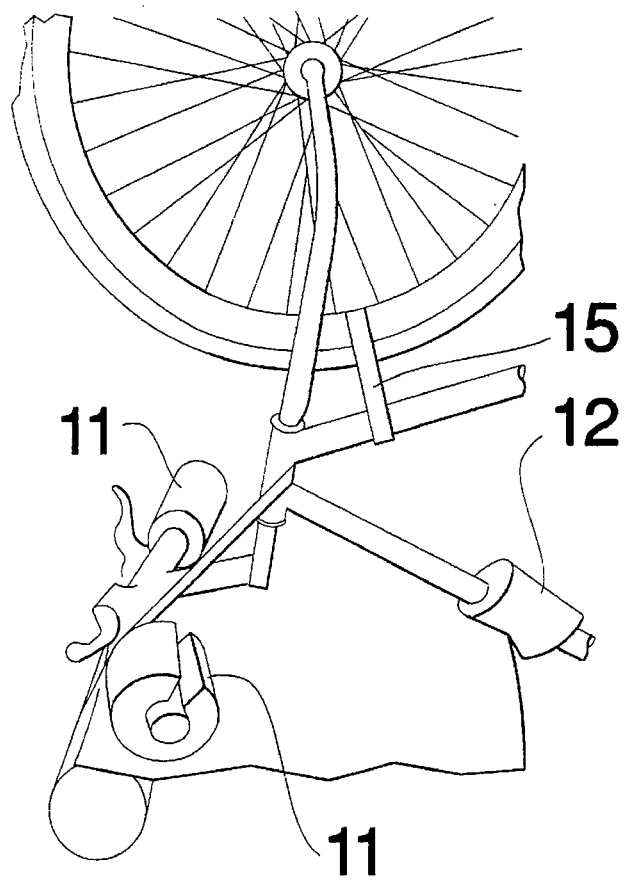
FIG. 3
FIG. 4
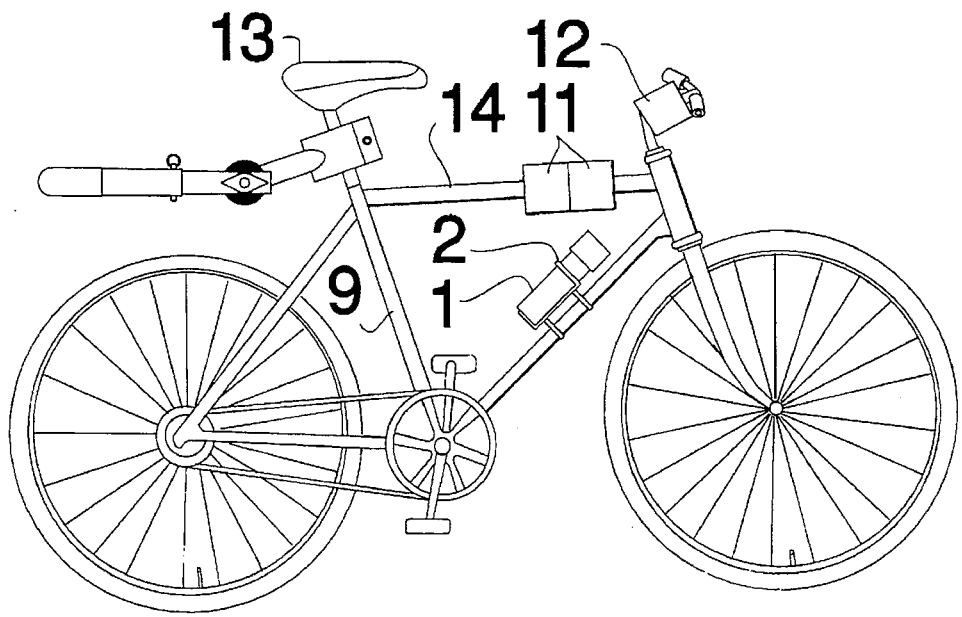

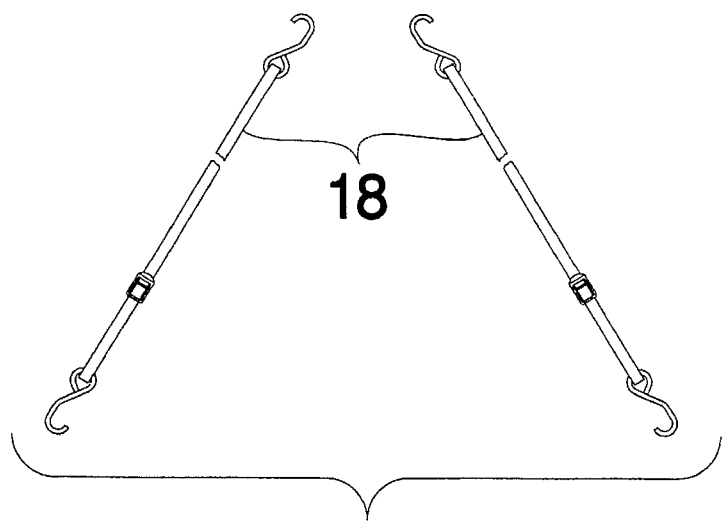
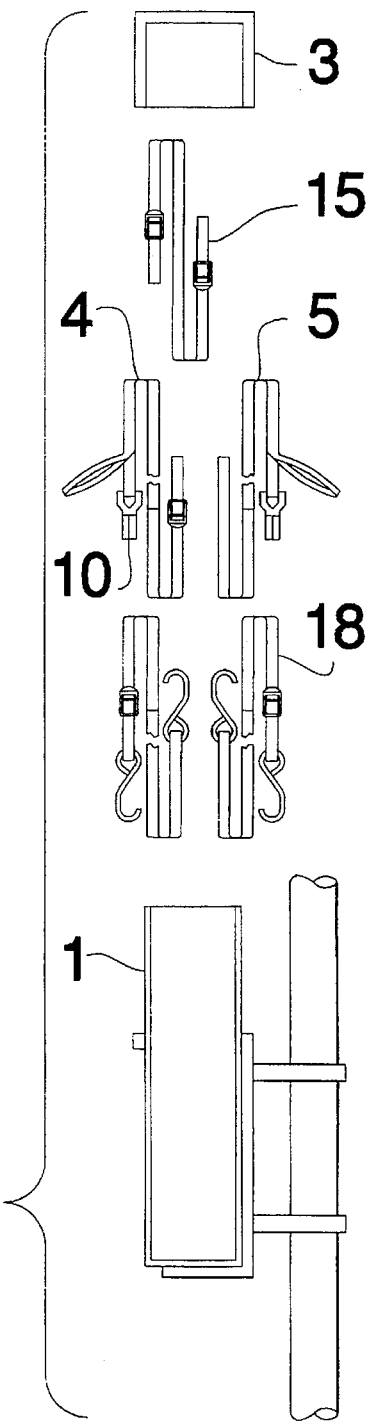
FIG. 5
FIG. 6

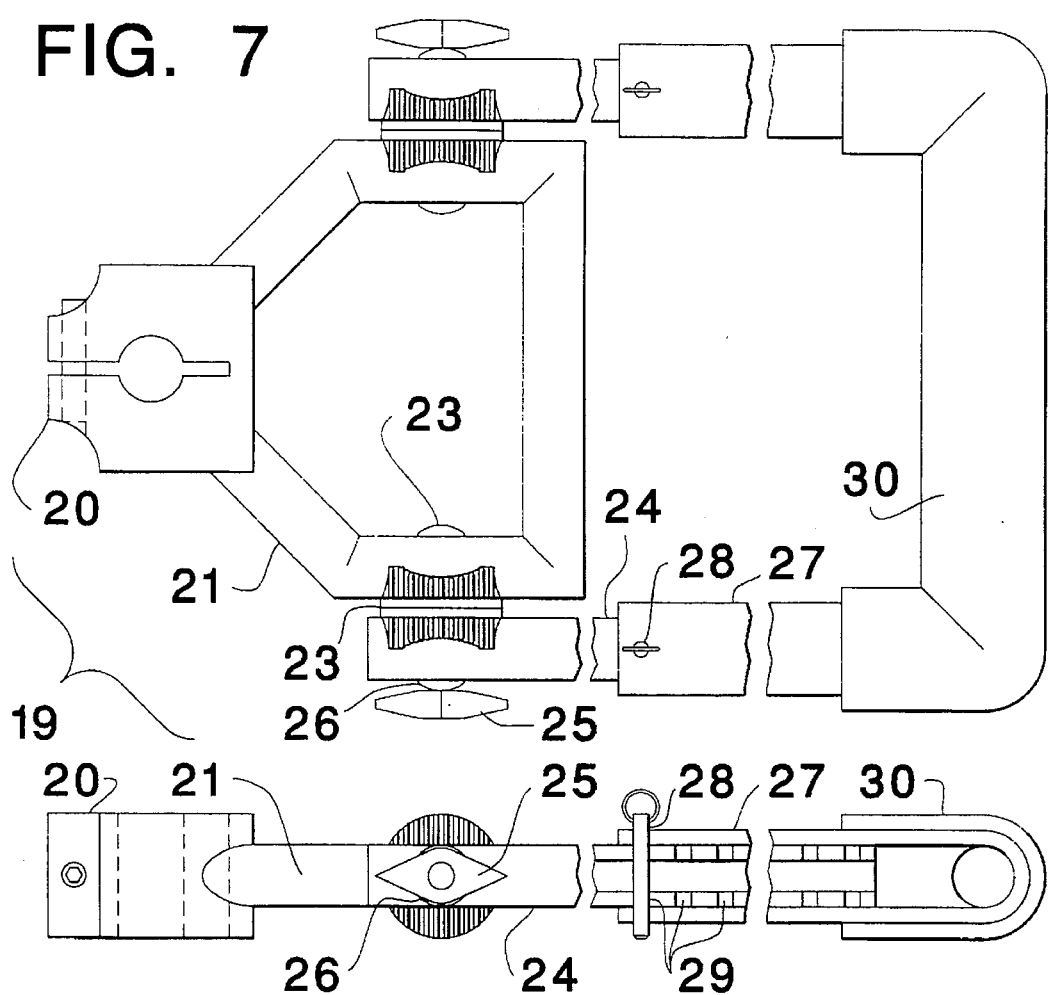
FIG. 7
FIG. 8
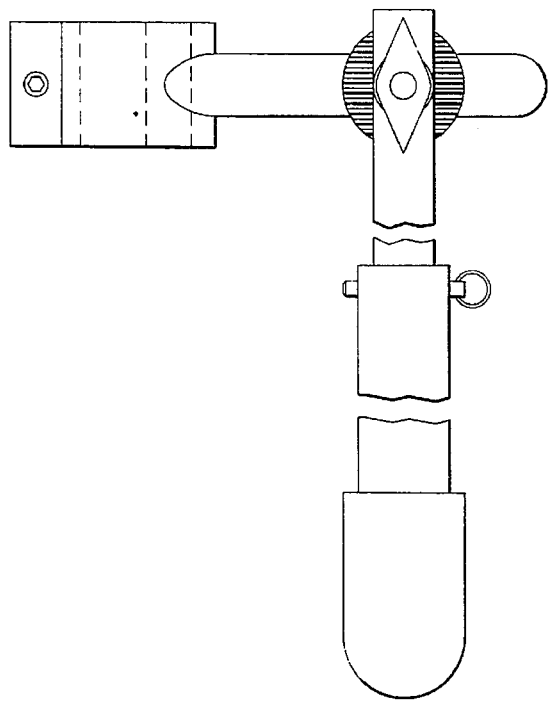
FIG. 9

BICYCLE CARRIER

FIELD OF THE INVENTION

The present invention relates to bicycle accessories and more specifically to a portable, collapsible lightweight bicycle carrier for mounting a bicycle or bicycle like structure on the rear of a vehicle that can be stowed and carried easily on the bicycle.

BACKGROUND OF THE INVENTION

There are numerous devices available for transporting bicycles on vehicles such as automobiles. Some of these devices are designed to carry bicycles on the roof of the vehicles. One such device is described in U.S. Pat. No. 4,524,893 to Yakima. These racks are difficult to install and generally not adaptable to a wide range of vehicles in addition, such "roof racks" are cumbersome and cannot be transported on the bicycle when not in use. Thus, these bicycle carriers do not provide the security of having a means of transporting a bicycle on an automobile in case of a bicycle breakdown.

Other designs, such as the design described in U.S. Pat. No. 5,056,700 to Blackburn, are trunk mounted and rigid. These devices have rigid arms that extend rearward to support the bicycle perpendicular to the automobile. This design provides numerous opportunities for damaging both the car and the bicycle and tend to obstruct the taillights and license plate of the vehicle. Although these designs tend to be lightweight and foldable, they remain unpractical for the purpose of being carried on the bicycle or with the bicycle rider when the carrying device is not being used.

Still other devices, such as U.S. Pat. No. 5,118,018 to Baldeck and U.S. Pat. No. 5,230,449 to Collins, have tried to provide for lightweight transportable carriers. These devices all use a number of straps or cables that suspend the bicycle parallel to the bumper of an automobile. Each of these designs are complicated to install correctly and when installed improperly can damage the automobile and the bicycle. When installed correctly these devices often obstruct the posterior of the automobile causing a potential traffic hazard. In addition, these designs tend to provide for only one bicycle to be carried on the vehicle at any one time. Although lightweight and compact these devices also do not provide for any stowage capability for the bicycle rider.

SUMMARY AND OBJECT OF THE INVENTION

It is the object of the present invention to provide a simple, inexpensive, and effective means of transporting bicycles on a vehicle that can be removed and installed easily by one person and stowed safely on the bicycle.

It is a further objective of this invention to provide a means for carrying more than one bicycle on a vehicle in an aerodynamic position that does not obstruct the tail lights or license plates of the vehicle.

It is a still further objective to provide a rearward support structure for use on vehicles with short or atypical rearward portions or on bicycles with downward sloping top tube frame members.

It is an even further objective to provide a rearward support structure that when not in use to support the bicycle on a vehicle, can be used as a rearward racking system by the cyclist to carry parcels on the bicycle, or be used as the cyclist as a bicycle work stand.

One preferred embodiment of the present invention comprises a capped hollow tube sized to fit in a standard water bottle receiver; two soft nylon webbing straps with formed loops dimensioned to fit tightly over the hollow tube and ends supplied with means to fasten the bicycle; three foam pads slit along the hollow center to clip over the frame and handles; a set of soft webbing straps with hooks and quick release adjusting buckles to secure the posterior of the bicycle; and a single strap with fastening means secures the front wheel to the frame of the bicycle. A rearward support structure fabricated to fasten securely to the seat post of the bicycle may also be provided for use on vehicles with short or atypical rearward portions.

The two formed loops are positioned on the hollow tube. The rearward portion of the vehicle, i.e., the trunk of rear hatch, is opened and the hollow tube and strap assembly is anchored inside the vehicle in the gap between the rearward portion and the vehicle body. The foam pads are then placed on the handles and top tube of the bicycle. The single strap is used to secure the front wheel in line with the frame of the bicycle. The bicycle is inverted and fastened to the trailing ends of the looped straps as it is positioned on the rearward portion of the vehicle. Two straps are used to fasten the rear of the bicycle to the vehicle. The straps are tightened and the bicycle is secured.

The bicycle can be placed and secured anywhere along the rearward portion of the vehicle. This gives the user the ability to secure one or more bicycles on the same vehicle at one time. Installation of the carrier is simple, easy and requires no adjustments to the webbing straps. When the rear straps are tightened the bicycle is held in tension and firmly secured. When the carrier is removed the webbing straps can be safely stored in the capped hollow tube and placed in a water bottle cage on the bicycle. The foam pads can be stored on the top tube or steering stem of the bicycle. Stored properly these foam pads can also protect the bicycle rider from contacting the bicycle in the event of a collision.

An additional rearward support structure may also be used with the present embodiment when installed on vehicles with short rearward portions. This structure, further known as the rearward support structure, consists of an adjustable rectangular shaped rigid section connected to a fixed location on the bicycle. The rearward support structure in the preferred embodiment may be connected to the seat post of the bicycle and have extending members which support the bicycle in a secure fixed position relative to the vehicle. The rearward support structure can be multifunctional in that it may also be used as bicycle rack for the goods which are to be transported on the bicycle when a rider is traveling on the bicycle.

The rearward support structure is used to secure the bicycle on vehicles with short rearward sections. Pads may be installed on the portion of the structure contacting the vehicle frame. The rearward straps are used in the same fashion as previously explained. In addition, the rearward support structure can also be implemented on bicycles that do not have a standard crossbar, such as found on the standard female bicycle.

The present invention provides many advantages over the prior art. The design provides for a proper and safe means of stowage for transport on the bicycle. In addition, the design enables the user to mount more than one bicycle on the same vehicle in an aerodynamic fashion while avoiding the obstruction of the taillights and license plate of the vehicle. It also offers the driver of the automobile a clear view of the bicycles without severely obstructing the drivers rearward visibility.

Other objects and advantages of the present invention will be more apparent with reference to the detailed description described herein.

BRIEF DESCRIPTION OF THE DRAWINGS

These and further objects and advantages of the present invention will become more apparent with reference to the drawings and the detailed description to follow herein.

FIG. 1 is a side perspective view of the preferred embodiment attaching a bicycle to the rear of an automobile.

FIG. 2 is a more angular perspective of an alternative embodiment including the rearward support structure being used to support the bicycle to the vehicle.

FIG. 3 is a close up side perspective and cut away view showing the anchoring tube in position.

FIG. 4 is a side perspective view demonstrating how the carrier is stored on the bicycle and the rearward support structure in position for use as a rack to hold a riders goods during travel on the bicycle.

FIG. 5 is an exploded composite plan view showing the straps and looped straps positioned on the capped hollow tube.

FIG. 6 is an exploded composite plan view showing the hollow tube, straps, tube cap and bottle cage holder in position for storage.

FIGS. 7-9 are detailed top and side views of the additional rearward support structure which may used in an alternative embodiment of the present invention.

DETAILED DESCRIPTION OF THE PREFERRED EMBODIMENT

A preferred embodiment of the present invention is described below with reference to the above described figures. The preferred embodiment is provided for the purpose of describing the invention and is not intended to restrict the scope of the invention beyond the scope of the allowed claims.

With reference to FIGS. 1-9, the bicycle is fastened to a vehicle using the following procedure. The hollow tube 1 is removed from the water bottle receiver 2 on the bicycle 9. The cap 3 is removed and the straps stored within the tube 1 are removed. The looped straps 4, 5 are slid over the tube 1. The looped straps 4, 5 can be positioned anywhere along the length of the hollow tube 1 to provide proper spacing to accommodate most any bicycle 9. The looped straps 4, 5 are positioned so the long trailing ends 16, 17 are above the shorter hooked ends 10 that secure the handles of the bicycle 9. The rearward portion of the vehicle is opened and the hollow tube 1, equipped with the looped straps 4, 5, is placed in the gap 6 between the car body 7 and the rearward portion 8. The rearward portion 8 of the vehicle is closed to anchor the hollow tube 1 with the trailing ends of the looped straps 4, 5 extending through the gap 6 ready to receive the front of the bicycle 9. In a preferred embodiment the shorter trailing ends of the looped straps 4, 5 are equipped with nylon coated wire hooks 10 that will attach to the handlebars of the bicycle 9. The longer trailing ends 16, 17 of the looped straps 4, 5 will further anchor the front of the bicycle.

The foam pads 11 are then removed from their storage position which is preferably, the frame of the bicycle 9. The foam pads 11 have a hollow center with an inside diameter sized to fit over the handlebars. The foam pads 11 are further slit along this center so the pads can be clipped on to the frame or steering stem of the bicycle 9 for storage during cycling. Two of the foam pads 11 are installed on to the handles of the bicycle 9. The foam pads 11 are readily adaptable to different bicycles with various handle configurations. The foam pads 11 should be of sufficient diameter to provide for proper clearance between the bicycle 9 and the vehicle to eliminate potential damage. The foam pads 11 are then installed symmetrically on the widest suitable position of the handlebars. The slit portion of the foam pad 11 is positioned downward so as when the bicycle 9 is inverted and placed on the automobile the closed portion of the foam pads 11 contact the vehicle.

The third pad 11 is slid over the top tube 14 of the bicycle 9 in a similar fashion and placed at the intersection point 12 between the bicycle frame and the automobile. On some vehicles it may be necessary to remove the seat 13 of the bicycle 9 to provide proper placement of the third pad 11. On automobiles with long trunk sections or others with rearward sections that are in a more vertical plane, such as vans or recreational vehicles, the seat 13 can be used instead of the third pad 11 as the contact point for the posterior of the bicycle 9.

A rearward support structure 19 can be substituted for the third pad 11 in most applications. The rearward support structure 19 adds lateral stability and does not require the user to remove the seat from the bicycle. The rearward support structure 19 is necessary for use on vehicles with short or atypical rearward portions. The rearward support structure 19 is firmly mounted to the seat post of the bicycle using a clamping mechanism 20 that is firmly fastened to the first section of formed tubing. The middle sections 24 of formed tubing are mated to the first section 21 using a incremental clamping system 22. The incremental clamping system 22 is secured with a threaded bolt 23 positioned through holes drilled appropriately in the first section 21 and middle section 24 of formed tubing. Wing nuts 25 and cupped washers 26 secure the sections as the wing nuts 25 are tightened. The rear section 27 of formed tubing has an inside dimension sized to fit snugly over the middle sections 24. The rear section 27 of formed tubing is U-shaped and slides easily over the middle sections 24. Two locking pins 28 secure the rear section 27 to the middle sections 24 through holes 29 which may be predrilled in the formed tubing. The locking pins 28 and holes 29 provide for longitudinal adjustment. An additional pad 30 is fitted to the rear section 27 at the intersection point between the rear support structure 19 and the vehicle.

A single strap 15 with buckle or VELCRO™ closure is used to secure the front rim and tire assembly to the down tube of the frame. This secures the front wheel and handle assembly and keeps it in line with the rear tire and frame. Any suitable means can be employed to obtain this objective.

The bicycle 9 is now inverted and placed on the posterior of the automobile. The handlebar, equipped with foam pads 11, is positioned parallel to the hollow tube 1 that was previously anchored to the vehicle. The nylon coated wire hooks 10 are positioned to receive the handle of the bicycle 9. The open end of the hooks 10 secure each side of the handlebar assembly and engage the foam pads 11 with the automobile. A special advantage of this embodiment is that no adjustment to the length of the looped straps 4, 5 is needed for this connection. Moreover, it places the bicycle handlebar assembly in a position to provide proper support and not bend, damage or unduly stress the automobile or bicycle 9. The secondary and longer trailing strap 16 is then placed around the anterior of the bicycle and secured to its mating strap 17 by means of an adjustable quick release buckle. The longer trailing strap 17 can be positioned in a variety of positions to suit differing combinations of bicycles and automobiles to achieve the desired results.

Another advantage of the present invention is that it is not always necessary to use both the nylon coated wire hooked strap 10 and the trailing strap 17 and buckle assembly. This combination of fastening means allows the user to apply the carrier to a variety of vehicles and bicycles. Furthermore, in a majority of situations both fastening means can be employed to provide double security to the connection.

With the anterior of the bicycle 9 affixed to the vehicle and the foam pads 11 properly arranged to protect the bicycle 9 and automobile, it is now possible to secure the posterior of the bicycle 9 to the automobile. The two straps 18 with vinyl coated wire hooks and adjusting buckles are employed to secure the rear of the bicycle 9 to the automobile. The hook 20 on one end is attached to a suitable location at the rear of the bicycle 9 while the other end is attached to a secure point on the bottom of the vehicle. The second strap is used to secure the bicycle 9 from a symmetrical point on the opposite side. The straps 18 are then tightened to secure the bicycle 9. The bicycle 9 is now ready to be transported by the automobile.

On vehicles with short rearward portions the rearward support structure 19 may be used to pull the bicycle 9 rearward to provide proper engagement of the looped straps 4, 5 and the bicycle handles and further optimizes the contact of the foam pads 11 with the vehicles rearward portion. The rear support structure 19 is adjusted using both the incremental clamping system 22 and the longitudinal adjustment as necessary to correctly position the bicycle 9 on a vehicles rearward portion. The two straps 18 are then attached as describe previously.

The rearward support structure 19 can also be utilized by the cyclist as a racking system to carry parcels or as a bicycle work stand simply by manipulating the incremental clamping device 22 to obtain the desired objective.

It should further be noted that the rearward support structure described herein is only one configuration of many that would achieve the desired results of supporting the posterior portion of the bicycle on the rearward portion of a vehicle. Any device that achieves the aforementioned results is still within the scope of this invention.

The above referenced discussion is intended to describe only preferred embodiments of the present invention and many variations are possible without straying from the intended scope of the invention. For instance, although the straps are shown to have looped attachment means to secure to the hollow tube and the like, the attachment means could be made in any number of styles such as a VELCRO attachments or a hole and hook attachment. Such obvious modifications would not stray from the present invention are included within the scope of the claims.

I claim:

1. A bicycle carrier for aerodynamically securing a bicycle having an anterior and a posterior portion, to an exterior of a vehicle having a hinged rear panel with one end facing a direction of travel for said vehicle and a rearward vehicle attachment element, said bicycle carrier comprising:

a removable anchoring element for engaging the end of the hinged rear panel facing the direction of travel for the vehicle;

a pair of straps, each of said straps having an anchoring engagement end for attachment to the anchoring element and a bicycle engagement end for securely engaging the anterior portion of the bicycle in proximity to the end of the hinged rear panel facing the direction of travel for the vehicle;

posterior bicycle attachment means for attaching the posterior of the bicycle to the rearward attachment element of said vehicle housing; and at least one buffering element for placement between the bicycle and the vehicle, whereby said bicycle carrier secures said bicycle to the vehicle such that the longitudional axis of the bicycle is aligned with the longitodinal axis of the vehicle when said pair of straps and said posterior bicycle attachment means are secured.

2. The bicycle carrier of claim 1 wherein said at least one buffering element comprises a pair of tubular elastomeric pads for positioning on opposite ends of a handle bar in said anterior portion of the bicycle to displace said handle bar from said vehicle by a predetermined distance and thereby avoid direct contact of said handle bar with said vehicle.

3. The bicycle carrier of claim 2 wherein said at least one buffering element further comprises a third elastomeric pad for positioning between a frame support tube of said bicycle and said vehicle housing to displace said frame support tube from said vehicle housing by a predetermined distance when the bicycle is secured to the vehicle.

4. The bicycle carrier of claim 3 further comprising an additional strap for securing a front wheel of said bicycle coupled to said handle bars to the frame support tube such as to retain said front wheel in a fixed position relative to the frame support tube.

5. The bicycle carrier of claim 1 wherein the support element is a capped hollow generally tubular like element which is sized to fit into a bicycle water bottle receiver connected to said bicycle and to receive each of said straps.

6. A bicycle carrier for aerodynamically securing a bicycle having an anterior and a posterior portion, to an exterior of a vehicle having a hinged rear panel having a forward portion relative to said vehicle and a rearward vehicle attachment element, said bicycle carrier comprising:

a capped hollow generally tubular like element which is sized to fit into a bicycle water bottle receiver connected to said bicycle;

a pair of straps, each of said straps having an anchoring engagement end for engaging the generally tubular like element in the vicinity of the hinged rear panel and a bicycle engagement end for securely engaging the anterior portion of the bicycle on the exterior portion of the hinged portion of the rear panel;

posterior bicycle attachment means for attaching the posterior of the bicycle to the rearward attachment element of said vehicle housing; and at least one buffering element for placement between the bicycle and the vehicle, whereby said bicycle carrier secures said bicycle to the hinged rear panel of the vehicle so as to permit aerodynamic and efficient placement of said bicycle on the vehicle when said pair of straps and said posterior bicycle attachment means are secured without damage to the vehicle housing.

7. A bicycle carrier of claim 6 further comprising a rearward support structure adapted to be fastened to remain said bicycle and thereon the bicycle for use as a utility rack.

8. A bicycle carrier of claim 6 wherein said rearward support structure comprises a coupling element, a rigid support member coupled to said coupling element, a longitudinally adjustable extension element, and a rotationally adjustable securing mechanism for securing said adjustable extension element in a fixed adjustable angular position relative to the rigid support member, whereby the rearward support structure positions the bicycle up and away from the exterior of the vehicle.

9. A bicycle carrier for securing a bicycle having a anterior portion and a posterior portion to an exterior of a vehicle having a rearward opening hatch exposing an interior of said vehicle, said bicycle carrier comprising:

a support element positionable in said interior of said vehicle;

a plurality of support straps for securing said anterior portion of the bicycle in a fixed position on the exterior of said vehicle relative to said support element;

a rear strap for securing the posterior of said bicycle to the motor vehicle;

a plurality of elastomeric absorption elements for displacing said bicycle a fixed distance from said exterior of said vehicle when the plurality of support straps are coupled to said anterior portion and the rear strap are secured to said posterior of the bicycle; and a rearward support structure comprising a coupling element for coupling the rearward support structure to the bicycle, a rigid support member coupled to said coupling element, a longitudinally adjustable extension element, and a rotational securing mechanism for securing the adjustable extension element in a fixed angular position relative to the rigid support structure, whereby the rearward support member is fixed to secure the bicycle on the vehicle.

10. The bicycle carrier of claim 9 wherein the support element is a capped hollow generally tubular element which is sized to fit in a water bottle receiver connected to said bicycle.

* * * * *